United States Patent
Biswas et al.

(10) Patent No.: US 6,277,925 B1
(45) Date of Patent: Aug. 21, 2001

(54) ALLYL COMPOUNDS, COMPOSITIONS CONTAINING ALLYL COMPOUNDS AND PROCESSES FOR FORMING AND CURING POLYMER COMPOSITIONS

(75) Inventors: Atanu Biswas, Newark, DE (US); Paul Joseph Caronia, Annandale, NJ (US); John Salvatore Furno, Newtown, CT (US); Laurence Herbert Gross, Bridgewater, NJ (US); Michael John Keogh, Pinehurst, NC (US); Frederick F. Nelson, Landenberg, PA (US); Tuyen T. Nguyen, Wilmington, DE (US)

(73) Assignees: Hercules Incorporated, Wilmington, DE (US); Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/271,906

(22) Filed: Mar. 18, 1999

(51) Int. Cl.[7] .................................................... C08F 10/00
(52) U.S. Cl. ........................................ 525/333.7; 524/323
(58) Field of Search ........................ 524/323; 525/333.7

(56) References Cited

U.S. PATENT DOCUMENTS

| | | |
|---|---|---|
| 3,378,510 | 4/1968 | Wheat et al. . |
| 3,751,378 | 8/1973 | Cowperthwaite et al. . |
| 3,873,640 * | 3/1975 | Owston ........................ 260/859 |
| 3,954,907 | 5/1976 | Schober . |
| 3,974,132 | 8/1976 | Valdiserri . |
| 4,015,058 | 3/1977 | Schober . |
| 4,018,852 | 4/1977 | Schober . |
| 4,025,706 | 5/1977 | Schober . |
| 4,131,636 | 12/1978 | Matsumoto et al. . |
| 4,829,123 * | 5/1989 | Shigematsu ........................ 525/28 |
| 4,857,571 | 8/1989 | Reiter et al. . |
| 4,954,589 * | 9/1990 | Sugawara ........................ 526/255 |
| 5,110,867 * | 5/1992 | Schutyser ........................ 525/114 |
| 5,210,157 * | 5/1993 | Schutyser ........................ 525/502 |
| 5,245,084 | 9/1993 | Groepper et al. . |
| 5,252,676 | 10/1993 | Suyama et al. . |
| 5,272,213 | 12/1993 | Knowles et al. . |
| 5,292,791 | 3/1994 | Groepper et al. . |
| 5,298,564 | 3/1994 | Suyama et al. . |
| 5,516,845 | 5/1996 | Heese et al. . |
| 5,696,190 | 12/1997 | Brooks et al. . |
| 5,700,856 * | 12/1997 | Smith ................................... 524/176 |
| 5,849,214 | 12/1998 | Novits et al. . |
| 5,869,580 | 2/1999 | Novits et al. . |
| 5,876,624 | 3/1999 | Novits et al. . |
| 5,912,304 | 6/1999 | Novits et al. . |
| 6,069,208 | 5/2000 | Novits et al. . |

FOREIGN PATENT DOCUMENTS

| | | |
|---|---|---|
| 1055642 | 5/1979 | (CA) . |
| 73435 | 3/1983 | (EP) . |
| 0504920 | 9/1992 | (EP) . |
| 504920 | 9/1992 | (EP) . |
| 522729 | 1/1993 | (EP) . |
| 0785229 | 7/1997 | (EP) . |
| 54-19032 | 7/1979 | (JP) . |
| 55-46666 | 11/1980 | (JP) . |

OTHER PUBLICATIONS

English language abstract of JP 52–95046, Nov. 9, 1993.
English language abstract of JP 50–001175 A, Jan. 8, 1993.
English language abstract of JP 57–080332 A, May 19, 1982.
English language abstract of JP 57–062228 A, Apr. 15, 1982.
ASTM D 5289–95, pp. 815–820.
ASTM D 1646–96a, pp. 1–10.
ASTM D 2084–95, pp. 1–11.
D. S. Tarbell, "Organic Reactions" vol. II, pp. 1–48, 1944. John Wiley & Sons, Inc., New York, (pp. 23, 23, and 26 enclosed).
English language abstract of JP 54–19032.
English language abstract of JP 55–46666.
English language abstract of JP 50–093446 A, Jan. 19, 1993.
English language abstract of JP 53–20269 A, Dec. 3, 1993.

* cited by examiner

Primary Examiner—Paul R. Michl
(74) Attorney, Agent, or Firm—Greenblum & Bernstein, P.L.C.

(57) ABSTRACT

Curable polymer compositions comprising a crosslinkable polymeric component; an initiator component; and an allyl compound component.

72 Claims, 1 Drawing Sheet

ALLYL COMPOUNDS, COMPOSITIONS CONTAINING ALLYL COMPOUNDS AND PROCESSES FOR FORMING AND CURING POLYMER COMPOSITIONS

BACKGROUND OF THE INVENTION

1. Field of the Invention

The present invention relates to the crosslinking of polymers using initiators, such as organic peroxides, and more specifically to the prevention of scorching in polymeric compositions, such as in compositions containing at least one polymer and at least one initiator. The present invention also relates to the use of allyl compounds as scorch retarders.

Still further, the present invention is directed to the formation of compositions which can be cross-linked, such as by heating, with reduced scorch, and to the resulting cross-linked polymers. Additionally, the present invention relates to the uses of the cross-linked polymers, such as for electrical insulation, industrial rubber products, e.g., hoses, belts, seals, and rotomolding plastic products.

2. Background Information

The production of crosslinked polymers is known in the art wherein the compositions forming the crosslinked polymers include, amongst other components, a polymeric component, and an initiator component. The problems with such compositions is that the compositions can undergo premature crosslinking, such as during compounding or processing, prior to the time in the processing when crosslinking of the composition is actually desired. For example, as discussed in U.S. Pat. Nos. 3,954,907 and 4,018,852, in order to process organic peroxide containing compositions so as to adapt them to be placed, as insulation, on the electrical conductor components of the wire and cable it is usually necessary to admix the components of the compositions at high temperatures, onto the electrical conductor. These processing activities occur prior to the intended vulcanization of the peroxide containing compositions, which is usually accomplished after such compositions are extruded onto the electrical conductor.

Scorch prevention can be accomplished by the use of additives in the composition acting as scorch retarders to prevent or reduce the premature crosslinking of the polymeric compositions. For example, U.S. Pat. No. 3,954,907 to Schober discloses that vulcanizable ethylene polymer based compositions which employ certain classes of organic peroxides therein as vulcanizing agents, and which compositions are susceptible to scorching under a given set of conditions, can be protected against scorching under such conditions by incorporating in such compositions certain monomeric monofunctional vinyl compounds.

Monomeric monofunctional vinyl compounds scorch retarders according to U.S. Pat. No. 3,954,907 include unsaturated additives such as lauryl methacrylate, α-methyl styrene, and n-butyl methacrylate, whereas compounds such as allyl caprylate and allyl phenyl ether are disclosed to produced little or no increase, if not a decrease, in an efficiency value disclosed therein.

U.S. Pat. No. 4,018,852 to Shober discloses that vulcanizable ethylene polymer based compositions which employ certain classes of organic peroxides therein as vulcanizing agents, and which compositions are susceptible to scorching under a given set of conditions, can be protected against scorching under such conditions by incorporating in such compositions certain classes of organic hydroperoxides and organic compounds containing at least three allyl groups.

Still further, other documents, such as U.S. Pat. No. 5,516,845 to Heese disclose coagents, such as triallylcyanurates, which do not function as scorch retarders, in polymeric compositions that are to be crosslinked.

While it is known to include various scorch retarders and coagents in crosslinkable polymeric compositions, there is still a need in the art to provide scorch retarders and compositions containing scorch retarders wherein the crosslinked polymer can maintain a high cross-link density.

SUMMARY OF THE INVENTION

It is an object of the present invention to provide curable polymer compositions that have increased scorch times.

It is also an object of the present invention to provide curable polymer compositions that can contain scorch retarders in low concentrations.

It is still another object of the present invention to provide curable polymer compositions that include one or more allyl compounds as scorch retarders.

In one aspect, the present invention is directed to curable polymer compositions comprising a polymeric component; an initiator component; and an allyl compound component as a scorch retarder.

In another aspect, the present invention is directed to curable polymer compositions comprising a polymeric component; an initiator component; and an allyl compound component as a scorch retarder, wherein the allyl compound component is present in an amount less than about 0.6 wt % of the total weight of the polymer composition, preferably less than about 0.5 wt % of the total weight of the polymer composition, even more preferably less than about 0.4 wt % of the total weigh of the polymer composition.

In another aspect, the present invention is directed to curable polymer compositions comprising a polymeric component; an initiator component; and an allyl compound component comprising at least one of 2-allylphenol; 2-allyl phenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; and tetramethyl diallylbisphenol A.

In another aspect, the present invention is directed to curable polymer compositions comprising a crosslinkable polymeric component; an initiator component; and an allyl compound component; the initiator component and the allyl compound component being present in amounts effective so that at a measured cured state, as measured by MDR delta torque, there is provided an increase in Ts2 time of at least 10% as compared to the measured cured state of a curable polymer composition containing the polymeric component and the initiator component in the absence of the allyl compound component.

In another aspect the present invention is directed to a curable polymer composition comprising a polymeric component; an initiator component; and an allyl compound component as a scorch retarder, wherein the allyl compound component comprises at least one mono phenyl derivative comprising the following structure:

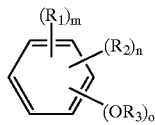

wherein:

$R_1$=allyl, alkyl, alkenyl or alkoxy groups of 1 to 4 carbon atoms $R_2$=hydrogen, or allyl, alkyl or alkenyl groups of 1 to 4 carbon atoms $R_3$=hydrogen, or allyl, alkyl or alkenyl groups of 1 to 4 carbon atoms wherein at least one of $R_1$, $R_2$ and $R_3$ is an allyl group m=1 to 3 n=1 to 3 o=1 to 2

In another aspect, the present invention is directed to a curable polymer composition comprising a polymeric component; an initiator component; and an allyl compound component as a scorch retarder, wherein the allyl compound component comprises at least one bis-phenyl derivative comprising the following structure:

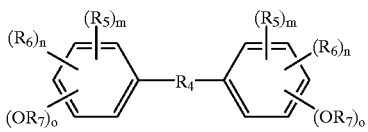

wherein:

$R_4$=2-propyl, methyl, S, O or a covalent bond $R_5$=allyl, alkyl, alkenyl or alkoxy groups of 1 to 4 carbon atoms $R_6$=hydrogen, or allyl, alkyl or alkenyl groups of 1 to 4 carbon atoms $R_7$=hydrogen, or allyl, alkyl or alkenyl groups of 1 to 4 carbon atoms wherein at least one of $R_5$, $R_6$ and $R_7$ is an allyl group m=1 to 3 n=1 to 3 o=1 to 2

In another aspect, the present invention is directed to methods of forming curable polymer compositions comprising combining a polymeric component, an initiator component, and an allyl compound component; and the initiator component and the allyl compound component being combined in amounts effective so that at a measured cured state, as measured by MDR delta torque, there is provided an increase in Ts2 time of at least 10% as compared to the measured cured state of a curable polymer composition containing the polymeric component and the initiator component in the absence of the allyl compound component.

In still another aspect, the present invention is directed to methods of forming a shaped article, comprising combining a polymeric component, an initiator component, and an allyl compound component to form a curable polymer composition, the initiator component and the allyl compound component being combined in amounts effective so that at a measured cured state, as measured by MDR delta torque, there is provided an increase in Ts2 time of at least 10% as compared to the measured cured state of a curable polymer composition containing the polymeric component and the initiator component in the absence of the allyl compound component; and shaping the curable polymer composition. For example, the curable polymer composition can be shaped into useful configurations by processes such as extrusion, pultrusion, compression molding, injection molding and rotomolding.

In still another aspect, the present invention is directed to cured polymer compositions.

The Ts2 time is preferably measured at a temperature of about 260° F. to 400° F., and is more preferably measured at a temperature of 300° F. The curable polymer composition preferably has a Ts2 time at 300° F. of greater than about 25 minutes, more preferably greater than about 28 minutes, and even more preferably greater than about 30 minutes.

The curable polymer is preferably comprises a polymer containing ethylene, preferably as a principal monomer, such as an ethylene copolymer, and wherein the ethylene copolymer preferably has a delta torque of about 5 in-lbs (inch-pounds).

The increase in Ts2 time is at least about 20%, more preferably at least about 50%, and even more preferably at least about 75%.

Preferably, the initiator component comprises at least one organic peroxide compound, such as at least one of dialkyl peroxides, peroxy esters, and peroxy ketals.

The allyl compound component preferably comprises at least one of mono phenyl derivatives and bis-phenyl derivatives.

Moreover, as noted above, the allyl compound component preferably comprises at least one of 2-allylphenol; 2-allyl phenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; and tetramethyl diallylbisphenol A.

The allyl compound component preferably does not comprise allyl esters and allyl derivatives of heterocyclic aromatics.

BRIEF DESCRIPTION OF DRAWINGS

The invention will be better understood, and other characteristics will become apparent upon reading the description that follows, with reference to the annexed drawings, in which.

DETAILED DESCRIPTION OF THE PREFERRED EMBODIMENTS

Figure 1:
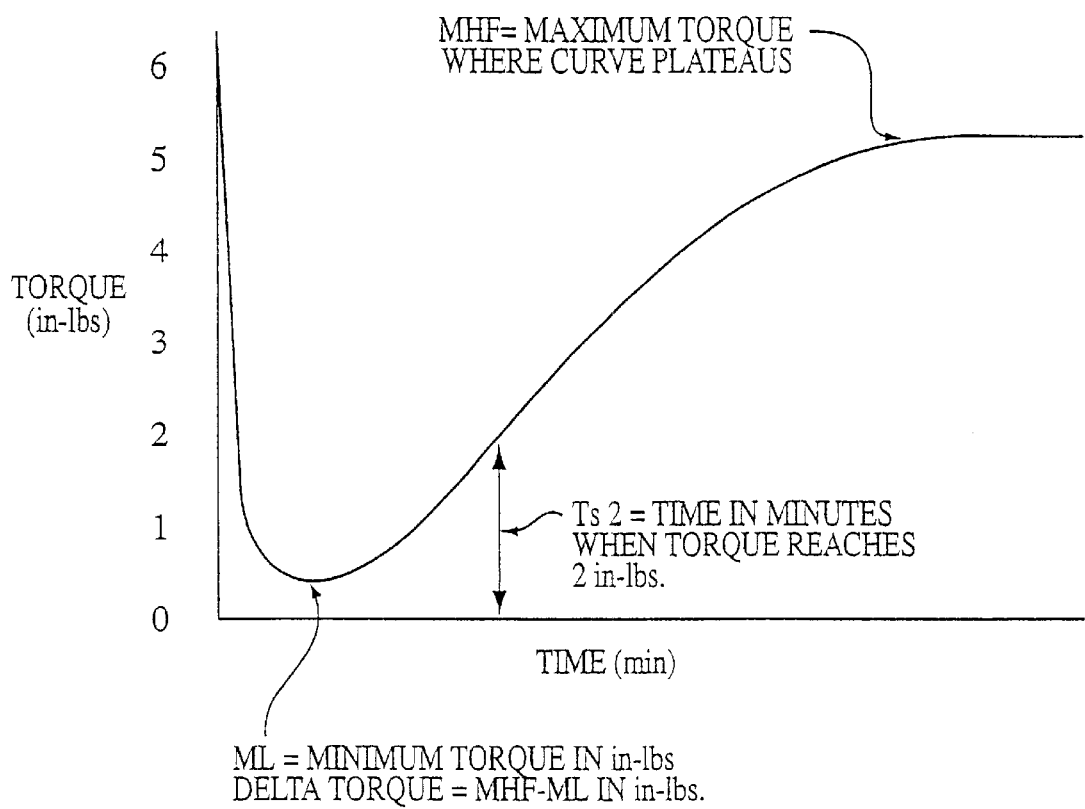
FIG. 1 illustrates a typical curve generated when a crosslinkable polymer is tested in an Alpha Technologies (formerly Monsanto) MDR 2000 moving die rheometer, wherein the abscissa is in units of time (minutes) and the ordinate is in units of torque (in-lbs).

Unless otherwise indicated, all percentages, parts, ratios, etc. stated herein are by weight. Moreover, all percent values in this application, unless otherwise stated, are calculated by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

The present invention is directed to curable polymer compositions containing a polymeric component, an initiator component, and an allyl compound component.

Preferably, the allyl compound component and the initiator component are present in amounts effective so that at a measured cured state, as measured by MDR delta torque, there is provided an increase in Ts2 time of at least 10% as compared to the same measured cured state of a curable polymer composition containing the same polymeric component and the same initiator component in the absence of the allyl compound component. The Ts2 time is preferably measured at temperatures of 260° F. to 400° F., more preferably 300° F., and the cured state, as measured by MDR delta torque, is preferably measured at 360° F. In other words, in order to effectively compare the performance of scorch retarding agents in curable polymers, the comparison should be made at similar cure states, i.e., the same degree of crosslink, wherein MDR delta torque is a measure of the cure state.

Expanding upon the above, it is noted that the addition of allyl compounds is expected to affect the MDR delta torque. Therefore, in order to obtain the desired MDR delta torque to make the proper comparison, the amount of initiator is preferably adjusted.

Thus, to provide an increase in Ts2 time of at least 10% as compared to the measured cured state of the polymer composition containing the initiator component in the absence of the allyl compound component, the amount of initiator component can be adjusted to maintain the same state of cure. Moreover, the performance of the scorch retarding agents is expected to be comparable at different states of cure, i.e., at higher and lower MDR delta torque values.

When referring to the composition containing the initiator component alone as compared to the composition also containing the allyl compound component, the comparison is being made between compositions which, with the exception of the allyl compound component, contain the same ingredients. Thus, for example, to formulate a composition according to the present invention, a polymer composition is prepared that includes the initiator component in the absence of the allyl compound component, and the cured state, as measured by MDR delta torque at a temperature, is determined. A similar composition is prepared, but containing an allyl compound component, with the concentration of initiator component being adjusted relative to the amount of allyl compound component in the composition to provide a same MDR delta torque at the same measured temperature. The determination of the relative amounts of initiator component and allyl compound component providing the same MDR delta torque at the measured temperature (in comparison with the composition containing the initiator alone) can be performed by varying the amount of initiator component or allyl compound component, preferably the amount of initiator component, and actually achieving or interpolating to obtain the same MDR delta torque at the same measured temperature as the composition containing the initiator component alone.

To ascertain if a composition is encompassed by the composition according to the present invention, the composition containing the initiator component and the allyl compound component is tested so as to determine its MDR delta torque and Ts2. Then another composition is prepared with an amount of initiator component in the absence of the allyl compound component (initiator component only composition), with the MDR delta torque of this composition being measured at the same temperature utilized for determining the MDR delta torque of the composition containing initiator component and allyl compound component. The initiator component concentration is varied in this initiator component only composition, until an actual measurement of the same MDR delta torque is obtained or a measurement of the same MDR delta torque can be interpolated. The Ts2 time is then measured for this initiator component only composition at the same temperature as the Ts2 time measurement for the composition containing both initiator component and allyl compound component. The Ts2 times are compared, and if the Ts2 time of the allyl compound component containing composition is increased relative to the composition not containing the allyl compound component by at least 10%, more preferably at least 20%, even more preferably at least 50%, and even more preferably at least 75%, the composition containing allyl compound component is according to the present invention.

Further elaborating on the above, it is noted that when compositions with and without the allyl compound component are being compared, the same ingredients should be included therein. For example, any adjuvants, such as fillers, blowing agents, etc., that are present in one composition should be included in the comparison composition.

The polymeric component according to the present invention can comprise various polymers, and are preferably elastomeric and/or thermoplastic polymers which can be crosslinked (vulcanized, cured) with a free radical generating compound. The polymers can be utilized individually, or can be utilized in combination with one or more different polymers. For example, polymers according to the present invention include polyethylene, such as linear low density polyethylene, low density polyethylene, high density polyethylene and chlorinated polyethylene; ethylene-propylene copolymers; ethylene vinyl acetate copolymers; silicone elastomers; nitrile elastomers; chlorosulfonated polyethylene elastomer; neoprenes; chlorosulfonated polyethylene, and fluoroelastomers. Preferably, the curable polymer comprises a polymer containing ethylene, preferably as a principal monomer, such as an ethylene polymer such as ethylene copolymers, such as DFNE-4901 pelleted polyethylene (Union Carbide Corporation, New York, N.Y.). For example, when two or more monomers are present in the polymer, e.g. copolymer or terpolymer, the ethylene monomer is present in the majority as compared to each other monomer. Preferred polymers include, but are not limited to, polymers containing ethylene, including high density polyethylene (HDPE), low density polyethylene (LDPE), linear low density polyethylene (LLDPE), chlorinated polyethylene (CPE), ethylene vinyl acetate polymer (EVA), ethylene octene copolymers, ethylene hexene copolymers, ethylene butene copolymers, ethylene-propylene elastomer (EPR) and ethylene-propylene diene elastomer (EPDM).

The initiator component according to the present invention can comprise compounds, preferably peroxides, that decompose to generate free radicals during the curing. The initiators can be utilized individually, or can be utilized in combination with one or more different initiators. Suitable initiators include organic peroxides, such as dialkyl peroxides, peroxy esters and peroxy ketals. Preferred initiators comprise organic peroxides, and more preferably comprise organic peroxides which have the following structures:

Dialkyl peroxides of the following structures:

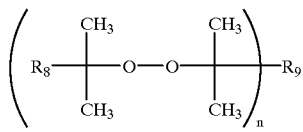

wherein:
$R_8$=alkyl, aryl or alkaryl groups of 1 to 9 carbon atoms
$R_9$=alkene, phenylene, alkyl, aryl or alkynyl groups of 1 to 9 carbon atoms
n=1 or 2

Peroxy esters of the following structures:

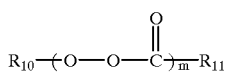

wherein:
$R_{10}$=tertiary alkyl groups of 4 to 5 carbon atoms
$R_{11}$=alkyl, alkoxy, aryl, alkaryl or phenylene groups of 1 to 12 carbon atoms
m=1 or 2

Peroxy ketals of the following structures:

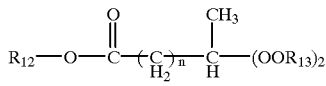

wherein:
$R_{12}$=alkyl group of 2 to 4 carbon atoms
$R_{13}$ tertiary alkyl group of 4 to 5 carbons atoms
n=1 or 2; and

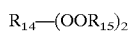

wherein:
$R_{14}$=alkyl or cyclo alkyl group of 3 to 9 carbon atoms
$R_{15}$=tertiary alkyl group of 4 to 5 carbon atoms Preferred initiators include:
Dialkyl peroxides, such as:
  di-cumyl peroxide;
  t-butyl cumyl peroxide;
  di-t-butyl peroxide;
  1,3/1,4-di(t-butyl peroxyisopropyl) benzene,
  2,5-dimethyl 2,5-di(t-butyl peroxy) hexane;
  2,5 dimethyl 2,5-di(t-butyl peroxy) hexyne-3;
  t-butyl isopropyl cumyl peroxide; and
  cumyl isopropyl cumyl peroxide.

Peroxy esters, such as:
  di(t-butyl peroxy)phthalate;
  t-butyl peroxy benzoate;
  t-butyl peroxy acetate;
  t-butyl peroxy-2-ethyl hexanoate;
  t-butyl peroxy isopropyl carbonate;
  t-butyl peroxy-2-methyl benzoate;
  t-butyl peroxy laurate;
  t-butyl peroxy diethyl acetate;
  t-butyl peroxy isobutyrate;
  t-amyl peroxy benzoate;
  t-amyl peroxy acetate; and
  t-amyl peroxy 2-ethyl hexanoate.

Peroxy ketals, such as:
  ethyl 3,3-di(t-butyl peroxy) butyrate;
  ethyl 3,3-di(t-amyl peroxy) butyrate;
  n-butyl 4,4-di(t-butyl peroxy) valerate;
  2,2-di(t-amyl peroxy) propane;
  2,2-di(t-butyl peroxy) butane;
  1,1-di(t-butyl peroxy) cyclohexane;
  1,1-di(t-butyl peroxy)-3,5,5-trimethyl cyclohexane; and
  1,1-di(t-amyl peroxy) cyclohexane.

The allyl compound component according to the present invention can comprise one or more allyl containing compounds that function as scorch retarders.

Preferably, the allyl compound component in conjunction with the initiator component is present in amounts effective so that at a measured cured state, as measured by MDR delta torque, there is provided an increase in Ts2 time of at least 10% as compared to said measured cured state of a polymer composition containing the initiator component in the absence of the allyl compound component. Preferably, the scorch retarder comprises only one or more allyl compounds; however, other compounds having scorch retarding abilities can also be used in conjunction with the allyl compound.

The cure properties, including Ts2 times and the MDR delta torque, are determined using reproducible test conditions, so that the obtained values are meaningfully accurate and precise. In particular, Ts2 and MDR delta torque times are determined in accordance with ASTM D 5289-95 using an MDR-2000 Moving Die Rheometer available from Alpha Technologies (formerly available from Monsanto Corporation) of Akron, Ohio, which is a sealed torsion type rotorless curemeter, at an arc of 1.0°, FIG. 1 illustrates a typical curve obtained utilizing the above-noted test, wherein the abscissa is in units of time (minutes) and the ordinate is in units of torque (in-lbs). As can be seen in FIG. 1, Ts2 is defined as the point in time, in minutes, at which the curve reaches a rheometer level of 2 in-lbs of torque on an upswing of the curve. MDR delta torque (MHF-ML) is defined as the maximum torque (MHF) achieved where the curve plateaus minus the minimum torque (ML) (See FIG. 1 and ASTM D 5289-95).

The temperature utilized for determining the Ts2 time is preferably 260° F. to 400° F., more preferably 300° F., and the temperature utilized for determining delta torque is preferably 360° F. In other words, the curve that is generated for determining the Ts2 time is generated by running the ASTM procedure preferably at a temperature within the range of 260° F. to 400° F., more preferably 300° F., whereas the curve that is generated for determining the delta torque is generated by preferably running the ASTM procedure at 360° F.

Expanding on the above, the allyl compound can comprise various allyl compounds that function as scorch retarders, and preferably comprise one or more allyl compounds to produce at least the about 10% increase in Ts2 time while at least substantially maintaining the overall cure density of the cured product. For example, the allyl compound can comprise various compounds that have 1–4 allyl groups, such as:

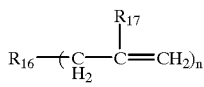

wherein:

$R_{16}$ can comprise any hydrocarbyl group, $R_{17}$ is a hydrogen or methyl, and n is a whole number of 1 to 4.

As used herein, the term "hydrocarbyl" is understood to include "aliphatic," "cycloaliphatic," and "aromatic." The hydrocarbyl groups are understood to include alkyl, alkenyl, alkynyl, alkenyloxy, cycloalkyl, aryl, aralkyl, aryloxy, alkaryl and diaryl groups, including diaryl groups such as biphenyl, diphenyl ether, diphenyl methane, diphenyl sulfide, 2,2-bisphenyl propane and 2,2 bisparaphenoxy propane. Preferably, each phenyl group includes at least one allyl group. Moreover, preferably each phenyl group includes two or more substitutions on the phenyl group. Still further, preferably each phenyl group includes at least one allyl group and at least one hydroxy or alkoxy group. Further, "hydrocarbyl" is understood to include both non-substituted hydrocarbyl groups, and substituted hydrocarbyl groups, with the latter referring to the hydrocarbon portion bearing additional substituents, besides carbon and hydrogen, such as oxygen.

Preferably, $R_{16}$ is a mono-, di- or tri-phenoxy group, with the one or more allyl groups attached to the ring directly, or through an oxygen. Moreover, preferably the aromatic ring can have various groups attached thereto, such as —OH, —$OR_{18}$, isopropenyl, and —$R_{18}$, where $R_{18}$ is 1–4 carbon atoms, saturated or unsaturated.

As noted above, preferably, each phenyl group includes two or more substitutions on the phenyl groups. Moreover, preferably the aromatic ring does not include heteroatoms, and thus preferred allyl compounds are not heterocyclic aromatics. Moreover, preferably, the allyl compound does not comprise allyl esters. Thus, preferably, the allyl compound does not comprise allyl esters, aliphatic allyl esters, allyl cyanurates and allyl isocyanurates, such as triallylcyanurate, triallylisocyanurate, triallylphosphate, triallylmellitate and diallylphthalate. However, such compounds can be included as non-scorch retardant components in the polymer composition. For example, such compounds can be included as coagents, such as disclosed in U.S. Pat. No. 5,516,845, which is incorporated by reference in its entirety, the disclosures of which are incorporated by reference herein in their entireties.

Preferred scorch retarders include mono phenyl derivatives of the following structure:

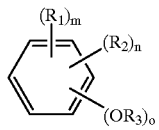

wherein:

$R_1$=allyl, alkyl, alkenyl or alkoxy groups of 1 to 4 carbon atoms $R_2$=hydrogen, or allyl, alkyl or alkenyl groups of 1 to 4 carbon atoms $R_3$=hydrogen, or allyl, alkyl or alkenyl groups of 1 to 4 carbon atoms wherein at least one of $R_1$, $R_2$ and $R_3$ is an allyl group m=1 to 3 n=1 to 3 o=1 to 2

Preferably, m+n+o is no more than 4.

Preferred scorch retarders also include bis-phenyl derivatives of the following structure:

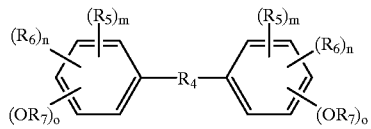

wherein:

$R_4$=2-propyl, methyl, S, O or a covalent bond $R_5$=allyl, alkyl, alkenyl or alkoxy groups of 1 to 4 carbon atoms $R_6$=hydrogen, or allyl, alkyl or alkenyl groups of 1 to 4 carbon atoms $R_7$=hydrogen, or allyl, alkyl or alkenyl groups of 1 to 4 carbon atoms wherein at least one of $R_5$, $R_6$ and $R_7$ is an allyl group m=1 to 3 n=to 3 o=1 to 2

Preferably, m+n+o is no more than 4 for each phenyl group.

Allyl compounds that are preferred according to the present invention include 2-allylphenol; 2-allyl phenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; and tetramethyl diallylbisphenol A. Moreover, preferred mixtures of allyl compounds include blends of 2,6-dimethyl-4-allylphenol and 4-isopropenyl- 2,6-dimethylphenyl allyl ether, preferably about 60 wt % of 2,6-dimethyl-4-allylphenol and about 40 wt % of 4-isopropenyl-2,6-dimethylphenyl allyl ether; and blends of 2,6-dimethylphenyl allyl ether and 2,6-dimethyl-4-allylphenyl allyl ether, preferably about 60 wt % of 2,6-dimethylphenyl allyl ether and about 40 wt % of 2,6-dimethyl-4-allylphenyl allyl ether.

The preparation of allyl phenyl ethers and their rearrangement to allyl substituted aromatic compounds is well known. See, for example, D.S. Tarbell, Organic Reactions, Volume II, pages 1–48 (1944), John Wiley & Sons, Inc., New York, the disclosure of which is incorporated by reference in its entirety.

In addition to the initiator component and the allyl compound component preferably being present in amounts effective so that at a measured cured state there is provided an increase in Ts2 time of at least about 10% as compared to the measured cured state of a polymer composition containing the initiator component in the absence of the allyl compound component, the allyl compound component preferably has one or more of the following properties. The allyl compound is preferably soluble in the polymer, preferably an ethylenic polymer, such as polyethylene and EPDM. In other words, the allyl compound preferably stays dispersed in the polymer under storage. The volatility of the allyl compound should preferably be sufficiently low so as to stay in the polymer during storage.

While it is noted that preferably the initiator component and the allyl compound component are present in amounts effective so that at a measured cured state there is provided an increase in Ts2 time of at least about 10% as compared to the measured cured state of a polymer composition containing the initiator component in the absence of the allyl compound component, it is noted that preferred compositions according to the present invention comprise the following ranges of components. The composition can comprise about 0.2 to 4 percent by weight of the initiator component, more preferably about 0.3 to 2.5 percent by weight of the initiator component and even more preferably about 0.5 to 1.8 percent by weight of the initiator component. Moreover, the composition can comprise about 0.02 to 2 percent by weight of the allyl compound component, more preferably about 0.03 to 1 percent by weight of the allyl compound component, even more preferably about 0.05 to 0.6 percent by weight of the allyl compound component, with the composition preferably comprising less than about 0.5 percent by weight of the allyl compound component, more preferably less than about 0.4 percent by weight of the allyl compound component, and even more preferably less than about 0.3 percent by weight of the allyl compound component.

Most preferably, the composition comprises as low an amount of allyl compound while providing the above discussed Ts2 time of at least 10% greater as compared to the polymer composition containing an initiator component alone, and having the same or at least substantially the same MDR delta torque as the polymer composition containing the initiator component alone. An advantage of having low amounts of allyl compound scorch retarder in the composition is that detrimental effects of the scorch retarder on the properties of the cross-linked polymer product can be avoided. Thus, the composition preferably contains less than 0.5 percent by weight of allyl compound, and even more preferably comprises less than about 0.4 percent by weight of allyl compound.

Either the initiator component or the allyl compound component can be adjusted relative to the other component to provide the above discussed Ts2 time of at least 10% greater as compared to the polymer composition containing an initiator component alone, and having the same or at least substantially the same MDR delta torque as the polymer composition containing the initiator component alone. Preferably, the amount of the initiator component in the composition is adjusted to achieve the desired delta torque while the allyl compound is adjusted to obtain the desired scorch properties.

In addition to the polymeric component, the initiator component and the allyl compound component, the compositions of the present invention can include other ingredients, such as other adjuvants. These adjuvants can include any adjuvants that are commonly included in crosslinkable polymer compositions, including fillers, such as, carbon black, clay, talc, and calcium carbonate; blowing agents; nucleating agents for blown systems; lubricants; UV stabilizers; dyes and colorants; voltage stabilizers; metal deactivators; coupling agents; water tree retardants; and antioxidants. The adjuvants would be used in amounts designed to provide the intended effect in the resulting composition.

The compositions according to the present invention can be processed in various manners for producing the cross-linked product. For example, all of the components of the compositions of the present invention can be blended or compounded together prior to their introduction into an extrusion apparatus from which they are to be extruded such as at temperatures of about 120° C. to 160° C. for polyolefins. After being extruded, the compositions of the present invention are vulcanized at elevated temperatures of about 140° C. or greater, preferably about 180° C. to 200° C., using vulcanizing procedures.

The polymeric component and the other desired components, including the initiator component and the allyl compound component can be blended together by various techniques used to blend and compound thermoplastics to homogenous masses. For instance, the components may be fluxed on a variety of apparatus including multi-roll mills, screw mills, continuous mixers, compounding extruders and Banbury mixers, or dissolved in mutual or compatible solvents.

When all of the solid components of the composition are available in the form of a powder, or as small particles, the compositions are most conveniently prepared by first making a blend of the components, such as in a Banbury mixer or a continuous extruder; and then masticating this blend on a heated mill, for instance a two-roll mill, and the milling continued until an intimate mixture of the components is obtained. Alternatively, a master batch containing the polymeric component and one or more antioxidants, and, if desired, some or all of the other components, may be added to the mass of polymer.

Where the polymeric component is not available in powder form, the compositions may be made by introducing the polymeric component to the mill, masticating it until it forms a band around one roll, after which a blend of the remaining components is added and the milling continued until an intimate mixture is obtained. The rolls, in the case of polyolefins, are preferably maintained at a temperature which is in the range of about 80° C. to 120° C., and which is below the rapid decomposition temperatures of the initiator component. The composition, in the form of a sheet, is removed from the mill and then brought into a form, typically dice-like pieces, suitable for subsequent processing.

The polymer compositions can have various uses including, without limitation, tire compositions (such as tread, undertread, sidewall, wire skim, inner liner, and bead compounds), industrial rubber compositions (such as hoses, belts, tubes, engine mounts, shock absorbers and isolators, weather stripping, moldings, and vehicle bumpers), and wire and cable (such as semi-conductor and insulating compounds).

EXAMPLES

The invention is illustrated in the following non-limiting examples, which are provided for the purpose of representation, and are not to be construed as limiting the scope of the invention. All parts and percentages in the examples are by weight unless indicated otherwise.

Acronyms utilized in the examples for ingredient utilized in the examples are defined in Table 1, with one column in Table 1 providing the common name of the ingredient and one column providing how the ingredient was obtained, such as by denoting its source or indicating how the chemical compound was prepared.

Comparative Example C-1

As illustrated in Table 2, this example does not include scorch retarder, but includes a mixture of 1.61 wt % Di-Cup® R (dicumyl peroxide) and 98.39 wt % DFNE-4901 pelleted polyethylene obtained from Union Carbide Corporation, New York, N.Y. The peroxide and polyethylene were placed in a flask in a water bath held at 70° C. The flask was rotated for 1.5 hr by which time all of the peroxide had been absorbed. The material was then placed in a 80° C. oven for about 16 hrs. to allow the peroxide to equilibrate throughout the polymer pellets.

The cure properties were determined from data obtained on an MDR 2000 Moving Die Rheometer purchased from the Monsanto Corporation (now Alpha Technologies) following the method utilizing ASTM D 5289-95 as described above. As illustrated in Table 2, the maximum delta torque was measured at 360° F., and found to be 5.0 in-lbs, the Ts2 scorch time measured at 300° F. was 17.8 min.

Examples 1–10

Each of these examples was performed by carrying out runs including varying amounts of initiator (Di-Cup® R) and allyl compound, as denoted in Table 2, blended with DFNE-4901 pelleted polyethylene. The initiator, allyl compound and polyethylene were blended in the same manner as in Comparative Example 1. In each of the examples, a number of runs were performed, with the objective being to determine the scorch time for the allyl compound when the cure state as measured by MDR delta torque was 5 in-lbs in which was found for Comparative Example 1. In order to accomplish this objective, experiments were conducted by varying the amount of initiator, i.e., by varying the concentration of Di-Cup® R, and interpolating the values to a delta torque of 5.0 in-lbs.

For example, in Example 1A, in order to accomplish this objective, experiments were conducted by varying the Di-Cup® R level while maintaining the MAPAE (2-methoxy-4-allylphenyl allyl ether) level at 0.1 wt %. With 1.3 wt % (®)up R and 0.1 wt % MAPAE, the delta torque was 4.43 in-lbs and the Ts2 time was 25.7 min. With 1.4 wt % Di-Cup® R and 0.1 wt % MAPAE, the values found were 5.13 in-lbs and 23.0 min. From this, it was possible to interpolate Di-Cup® R level and scorch time which would yield a delta torque of 5.0 in-lbs. These interpolated values were 23.5 min and 1.38% Di-Cup® R, as depicted in Table 2 for Example 1A.

For each of the other examples, i.e., Examples 1B–1D, 2-A–2D, 3A–3C, 4A–4C, 5A–5B, 6A–6D, 7A–7D, 8A–8D, 9A–9C and 10A–10B similar runs were performed using scotch retarders as indicated in Table 2, and the interpolated values of Di-Cup® R and scorch time are indicated in Table 2.

Comparative Example C-2

The procedure of Examples 1–10 was repeated except that 2,4-diphenyl-4-methyl-1-pentene (MSD) obtained from Nippon Oil and Fats Co., Ltd. (Tokyo, Japan), such as disclosed in U.S. Pat. No. 5,298,564, was utilized in place of the scotch retarders of Examples 1–10. Values of Ts2 obtained for this compound are shown in Table 2 for Comparative Examples 2A, 2B and 2C.

Comparative Examples C-3, C-4 and C-5

The procedure of Examples 1–10 was repeated except that diallyl ether of neopentyl glycol, diallyl ether of 1,10-decane diol and diallyl phthalate were utilized in place of the scorch retarders of Examples 1–10. Values of Ts2 obtained for this compound are shown in Table 2 for Comparative Examples C-3, C-4A to C-4B and C-5.

Comparative Example C-6

The procedure of Comparative Example 1 was repeated except that the DCP was replaced with Di(2-tert-butylperoxy-isopropyl) benzene (DBB). Results are presented in Table 3.

Example 11

The procedure of Example 1 was repeated except that the DCP was replaced with DBB as the initiator. The results are presented in Table 3.

Comparative Example C-7

The procedure of Comparative Example 1 was repeated except that the DFNE-4901 was replaced with Engage 8402. Results are presented in Table 3.

Example 12

The procedure of Example 6 was repeated except that Engage 8402 was substituted for DFNE-4901. Results are presented in Table 3.

Comparative Example C-8

The procedure of Comparative Example 1 was repeated except that the DFNE-4901 was replaced with the ethylene vinyl acetate, EVA NA 442. Results are presented in Table 3.

Example 13

The procedure of Example 12 was repeated except that the Engage 8402 was replaced with EVA NA442. Results are represented in Table 3.

Comparative Example C-9

The procedure of Comparative Example C-7 was repeated except that the DCP was replaced with D-16. Results are represented in Table 3.

Example 14

The procedure of Example 12 was repeated except that the DCP was replaced with D-16 and DAEBPA was replaced by MAPAE. Results are represented in Table 3.

TABLE 1

Materials and Source

| Acronym | Name | How Obtained |
|---|---|---|
| DBB | Di(2-tert-butylperoxy-isopropyl)benzene | Purity 96% meta plus para isomers produced by Hercules Incorporated and marketed as "Vul-Cup ® R" |
| DCP | Dicumyl peroxide | Purity 99% produced by Hercules Incorporated and marketed as "Di-Cup ® R" |
| D-16 | t-Butylcumyl peroxide | Purity 98% produced by Hercules Incorporated and marketed as Peroxide D-16 |
|  | HFDE-4201 | Low density polyethylene insulation compound pellets containing DCP and marketed by Union Carbide Incorporated |
|  | HFDE-4901 | HFDE-4201 but without the DCP |
| AP | 2-Allylphenol | Aldrich Chemical Company Incorporated, Chicago, Illinois |
| APE | Allyl phenyl ether | Aldrich Chemical Company Incorporated |
| DABPA | 2,2'-Diallylbisphenol A | Aldrich Chemical Company Incorporated |
| TMBPA | 2,2',6,6'-tetramethyl-bisphenol A | TCI America, Portland, Oregon |
| APAE | 2-Alkylphenyl allyl ether | Prepared by reaction of alkyl bromide with allyl phenol under alkaline conditions |
| DAEBPA | Diallyl ether of bisphenol A | Prepared by the reaction of allyl chloride with bisphenol A under alkaline conditions |
| DAEDD | Diallyl ether of 1,10-decanediol | Prepared by the reaction of allyl bromide with decane diol under alkaline conditions |
| DAENPG | Diallyl ether of neopentyl glycol | Prepared by the reaction of allyl bromide with neopentyl glycol under alkaline conditions |
| DAETMB | Diallyl ether of 2,2',6,6'-tetramethyl-bisphenol A | Prepared by the reaction of allyl bromide with 2,2',6,6'-tetramethylbisphenol A under alkaline conditions |
| DAP | Diallyl phthalate | Aldrich Chemical Company Incorporated |
| MAP | 2-Methoxy-4-allylphenol | Aldrich Chemical Company Incorporated |
| Engage 8404 | Ethylene Octene polymer | DuPont Dow Elastomers, Ltd., Wilmington, Delaware |
| EVA NA442 | Ethylene Vinyl Acetate | Equistar Chemicals, Houston, Texas |
| MAPAE | 2-Methoxy-4-allylphenyl allyl ether | Prepared by the reaction of allyl chloride with 2-methoxy-4-allylphenol under alkaline conditions |
| MSD | 2,4-Diphenyl-4-methyl-1-pentene | Purity 95% produced by Nippon Oil & Fats Co., Ltd. and marketed as "Nofmer MSD" |
| DMAP | 2,6-Dimethyl-4-allylphenol | 60% DMAP and 40% DMIPAE are recovered as a distillate when DAETMB is heated to 250° C. at a pressure of 10 mm Hg. |
| DMIPAE | 2,6-Dimethyl-4-isopropenylphenyl allyl ether | |
| DMPAE | 2,6-Dimethylphenyl allyl ether | 60% DMPAE and 40% DMAPAE are produced as coproducts by the reaction of 2,6-dimethylphenol with allyl bromide under alkaline conditions |
| DMAPAE | 2-6-Dimethyl-4-allylphenyl allyl ether | |

TABLE 2

Ts2 Times for Scorch Retarders in DFNE-4901 Insulation Compound at an MDR 360° F. Δ Torque of 5.0 in-lbs (Di-Cup ® R Used as the Crosslinking Agent)

| | Scorch Retarder | Scorch Retarder | Scorch Retarder, wt % | Di-Cup ® R, wt% | 300° F. Ts2, min |
|---|---|---|---|---|---|
| Comparative Example | | | | | |
| C-1 | None | None | | 1.61 | 17.8 |
| C-2A | MSD | AMS Dimer | 0.33 | 1.34 | 28.1 |
| C-2B | | | 0.60 | 1.46 | 31.4 |
| C-2C | | | 0.80 | 1.55 | 32.4 |
| C-3 | DAENPG | Diallyl ether of neopentyl glycol | 0.40 | 1.84 | 19.4 |
| C-4A | DAEDD | Diallyl ether of 1,10-decane diol | 0.80 | 1.86 | 18.3 |
| C-4B | | | 1.20 | 2.00 | 18.6 |
| C-5 | DAP | Diallyl phthalate | 0.40 | 1.49 | 17.8 |
| Example | | | | | |
| 1A | MAPAE | 2-Methoxy-4-allylphenyl allyl ether (MAPAE) | 0.10 | 1.38 | 23.5 |
| 1B | | | 0.20 | 1.42 | 28.0 |
| 1C | | | 0.40 | 1.52 | 32.8 |

TABLE 2-continued

Ts2 Times for Scorch Retarders in DFNE-4901 Insulation
Compound at an MDR 360° F. Δ Torque of 5.0 in-lbs
(Di-Cup ® R Used as the Crosslinking Agent)

| | Scorch Retarder | Scorch Retarder | Scorch Retarder, wt % | Di-Cup ® R, wt% | 300° F. Ts2, min |
|---|---|---|---|---|---|
| 1D | | | 0.60 | 1.73 | 32.5 |
| 2A | AP | 2-Allylphenol | 0.10 | 1.72 | 26.7 |
| 2B | | | 0.15 | 1.76 | 28.6 |
| 2C | | | 0.20 | 1.80 | 30.6 |
| 2D | | | 0.28 | 2.00 | 31.4 |
| 3A | DAETMB | Tetramethyl diallyl bisphenol A | 0.10 | 1.55 | 23.6 |
| 3B | | (stripped but not distilled) | 0.20 | 1.65 | 30.1 |
| 3C | | | 0.40 | 1.91 | 33.9 |
| 4A | MAP | (2-Methoxy-4-allylphenol) | 0.10 | 1.55 | 23.7 |
| 4B | | | 0.20 | 1.60 | 28.5 |
| 4C | | | 0.40 | 1.85 | 30.2 |
| 5A | DABPA | 2,2'-Diallyl bisphenol A | 0.20 | 1.67 | 28.2 |
| 5B | | | 0.40 | 1.88 | 31.5 |
| 6A | DAEBPA | O,O-Diallyl bisphenol A | 0.10 | 1.50 | 23.0 |
| 6B | | | 0.20 | 1.60 | 27.8 |
| 6C | | | 0.30 | 1.68 | 29.0 |
| 6D | | | 0.59 | 2.00 | 30.9 |
| 7A | 60/40 | 60/40 blend of 4-allyl-2,6- | 0.05 | 1.51 | 26.3 |
| 7B | Blend of | dimethylphenol and 4-isopropenyl- | 0.10 | 1.59 | 31.3 |
| 7C | DMAP | 2,6-dimethylphenyl allyl ether | 0.20 | 1.68 | 34.0 |
| 7D | and DMIPAE | | 0.36 | 2.00 | 32.5 |
| 8A | 61/37 | 61% 2,6-dimethylphenyl allyl ether, | 0.10 | 1.54 | 26.3 |
| 8B | Blend of | 37% 2,6 dimethyl 4-allyl phenyl | 0.20 | 1.68 | 29.2 |
| 8C | DMPAE | allyl ether | 0.30 | 1.83 | 29.8 |
| 8D | and DMAPAE | | 0.40 | 1.99 | 30.7 |
| 9A | APAE | 2-allyl phenyl allyl ether | 0.15 | 1.45 | 25.0 |
| 9B | | | 0.20 | 1.47 | 26.9 |
| 9C | | | 0.30 | 1.54 | 29.0 |
| 10A | APE | Allyl phenyl ether | 0.25 | 1.80 | 24.2 |
| 10B | | | 0.44 | 2.00 | 25.4 |

TABLE 3

Ts2 Times for Scorch Retarders in Polymers at
an MDR 360° F. Δ Torque of 5.0 in-lbs.

| | Polymer | Scorch Retarder | Scorch Retarder, wt % | Peroxide | Peroxide wt % | 300° F. Ts2, min |
|---|---|---|---|---|---|---|
| Comparative Example C-6 | DFNE-4901 | None | | DBB | 0.96 | 44.1 |
| Example 11 | DFNE-4901 | MAPAE | 0.20 0.40 | DBB | 0.93 0.99 | 62.1 69.3 |
| Comparative Example C-7 | Engage 8402 | None | | DCP | 1.51 | 18.2 |
| Example 12 | Engage 8402 | DAEBPA | 0.20 0.40 | DCP | 1.57 1.64 | 32.7 36.0 |
| Comparative Example C-8 | EVA NA442 | None | | DCP | 1.08 | 9.4 |
| Example 13 | EVA NA442 | DAEBPA | 0.20 0.40 | DCP | 1.01 1.22 | 22.0 27.0 |
| Comparative Example C-9 | Engage 8402 | None | | D-16 | 1.13 | 43.0 |
| Example 14 | Engage 8402 | MAPAE | 0.20 0.40 | D-16 | 1.20 1.34 | 73.3 75.2 |

Although the invention has been described with reference to particular means, materials and embodiments, it is to be understood that the invention is not limited to the particulars disclosed and extends to all equivalents within the scope of the claims.

What is claimed:

1. A curable polymer composition comprising:
    a polymeric component containing ethylene;
    an initiator component; and
    an allyl compound component;
    said initiator component and said allyl compound component being present in amounts effective so that at a measured cured state, as measured by MDR delta torque, there is provided an increase in Ts2 time of at least 10% as compared to said measured cured state of a curable polymer composition containing said polymeric component and said initiator component in the absence of said allyl compound component.

2. The curable polymer composition according to claim 1, wherein said Ts2 time is measured at a temperature within a range of about 260° F. to 400° F.

3. The curable polymer composition according to claim 2, wherein said Ts2 time is measured at a temperature of 300° F.

4. The curable polymer composition according to claim 1, wherein said polymeric component comprises copolymer containing ethylene.

5. The curable polymer composition according to claim 1, wherein said polymeric component comprises ethylene as a principal monomer.

6. The curable polymer composition according to claim 5, wherein said curable polymer composition has a Ts2 time at 300° F. of greater than about 25 minutes.

7. The curable polymer composition according to claim 6, wherein said curable polymer composition has a Ts2 time at 300° F. of greater than about 28 minutes.

8. The curable polymer composition according to claim 7, wherein said curable polymer composition has a Ts2 time at 300° F. of greater than about 30 minutes.

9. The curable polymer composition according to claim 2, wherein said MDR delta torque is measured at 360° F.

10. The curable polymer composition according to claim 5, wherein said Ts2 time is measured at a temperature of 300° F., and said MDR delta torque is measured at 360° F.

11. The curable polymer composition according to claim 3, wherein said increase in Ts2 time is at least about 20%.

12. The curable polymer composition according to claim 3, wherein said increase in Ts2 time is at least about 50%.

13. The curable polymer composition according to claim 3, wherein said increase in Ts2 time is at least about 75%.

14. The curable polymer composition according to claim 1, wherein said initiator component comprises at least one organic peroxide compound.

15. The curable polymer composition according to claim 14, wherein said at least one organic peroxide compound comprises at least one of dialkyl peroxides, peroxy esters and peroxy ketals.

16. The curable polymer composition according to claim 15, wherein said at least one organic peroxide comprises at least one dialkyl peroxide.

17. The curable polymer composition according to claim 16, wherein said at least one dialkyl peroxide comprises at least one of di-cumyl peroxide; t-butyl cumyl peroxide; di-t-butyl peroxide; 1,3/1,4-di(t-butyl peroxyisopropyl) benzene, 2,5-dimethyl 2,5-di(t-butyl peroxy) hexane; 2,5 dimethyl 2,5-dimethyl 2,5-di(t-butyl peroxy) hexyne-3; t-butyl isopropyl cumyl peroxide; and cumyl isopropyl cumyl peroxide.

18. The curable polymer composition according to claim 15, wherein said at least organic peroxide comprises at least one peroxy ester.

19. The curable polymer composition according to claim 18, wherein said at least one peroxy ester comprises at least one of di(t-butyl peroxy)phthalate; t-butyl peroxy benzoate; t-butyl peroxy acetate; t-butyl peroxy-2-ethyl hexanoate; t-butyl peroxy isopropyl carbonate; t-butyl peroxy-2-methyl benzoate; t-butyl peroxy laurate; t-butyl peroxy diethyl acetate; t-butyl peroxy isobutyrate; t-amyl peroxy benzoate; t-amyl peroxy acetate; and t-amyl peroxy 2-ethyl hexanoate.

20. The curable polymer composition according to claim 15, wherein said at least organic peroxide comprises at least one peroxy ketal.

21. The curable polymer composition according to claim 20, wherein said at least one peroxy ketal comprises at least one of ethyl 3,3-di(t-butyl peroxy) butyrate; ethyl 3,3-di(t-amyl peroxy) butyrate; n-butyl 4,4-di(t-butyl peroxy) valerate; 2,2-di(t-amyl peroxy) propane; 2,2-di(t-butyl peroxy) butane; 1,1-di(t-butyl peroxy) cyclohexane; 1,1-di(t-butyl peroxy)-3,5,5-trimethyl cyclohexane; and 1,1-di(t-amyl peroxy) cyclohexane.

22. The curable polymer composition according to claim 1, wherein said allyl compound component comprises at least one of 2-allylphenol; 2-allyl phenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; and tetramethyl diallylbisphenol A.

23. The curable polymer composition according to claim 1, wherein said allyl compound component comprises 2-allylphenol.

24. The curable polymer composition according to claim 1, wherein said allyl compound component comprises 2-allyl phenyl allyl ether.

25. The curable polymer composition according to claim 1, wherein said allyl compound component comprises 4-isopropenyl-2,6-dimethylphenyl allyl ether.

26. The curable polymer composition according to claim 1, wherein said allyl compound component comprises 2,6-dimethyl-4-allylphenol.

27. The curable polymer composition according to claim 1, wherein said allyl compound component comprises 2,6-dimethylphenyl allyl ether.

28. The curable polymer composition according to claim 1, wherein said allyl compound component comprises 2,6-dimethyl-4-allylphenyl allyl ether.

29. The curable polymer composition according to claim 1, wherein said allyl compound component comprises 2-methoxy-4-allylphenol.

30. The curable polymer composition according to claim 1, wherein said allyl compound component comprises 2-methoxy-4-allylphenyl allyl ether.

31. The curable polymer composition according to claim 1, wherein said allyl compound component comprises 2,2'-diallyl bisphenol A.

32. The curable polymer composition according to claim 1, wherein said allyl compound component comprises O,O'-diallyl bisphenol A.

33. The curable polymer composition according to claim 1, wherein said allyl compound component comprises tetramethyl diallylbisphenol A.

34. A curable polymer composition comprising:
a polymeric component;
an initiator component; and
an allyl compound component, said allyl compound component comprising a blend of 2,6-dimethyl-4-allylphenol and 4-isopropenyl-2,6-dimethylphenyl allyl ether;
said initiator component and said allyl compound component being present in amounts effective so that at a measured cured state, as measured by MDR delta torque, there is provided an increase in Ts2 time of at least 10% as compared to said measured cured state of a curable polymer composition containing said polymeric component and said initiator component in the absence of said allyl compound component.

35. A curable polymer composition comprising:
a polymeric component;
an initiator component; and
an allyl compound component, said allyl compound component comprising a blend of 2,6-dimethylphenyl allyl ether and 2,6-dimethyl-4-allylphenyl allyl ether;
said initiator component and said allyl compound component being present in amounts effective so that at a measured cured state, as measured by MDR delta torque, there is provided an increase in Ts2 time of at least 10% as compared to said measured cured state of a curable polymer composition containing said polymeric component and said initiator component in the absence of said allyl compound component.

36. The curable polymer composition according to claim 1, wherein said allyl compound component does not comprise allyl esters and allyl derivatives of heterocyclic aromatics.

37. The curable polymer composition according to claim 5, wherein said allyl compound component does not comprise allyl esters and allyl derivatives of heterocyclic aromatics.

38. The curable polymer composition according to claim 1, wherein said allyl compound component comprises at least one of a mono phenyl derivative and a bis-phenyl derivative.

39. The curable polymer composition according to claim 38, wherein said allyl compound component comprises at least one mono phenyl derivative comprising the following structure:

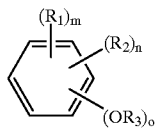

wherein:
- $R_1$=allyl, alkyl, alkenyl or alkoxy groups of 1 to 4 carbon atoms
- $R_2$=hydrogen, or allyl, alkyl or alkenyl groups of 1 to 4 carbon atoms
- $R_3$=hydrogen, or allyl, alkyl or alkenyl groups of 1 to 4 carbon atoms
  wherein at least one of $R_1$, $R_2$ and $R_3$ is an allyl group
- m=1 to 3
- n=1 to 3
- o=1 to 2.

40. A curable polymer composition comprising:
- a polymeric component;
- an initiator component; and
- an allyl compound component;
- said initiator component and said allyl compound component being present in amounts effective so that at a measured cured state, as measured by MDR delta torque, there is provided an increase in Ts2 time of at least 10% as compared to said measured cured state of a curable polymer composition containing said polymeric component and said initiator component in the absence of said allyl compound component; and
- said allyl compound component comprises at least one bis-phenyl derivative comprising the following structure:

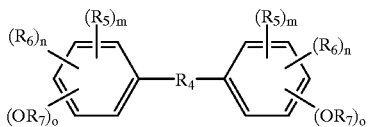

wherein:
- $R_4$=2-propyl, methyl, S, O or a covalent bond
- $R_5$=allyl, alkyl, alkenyl or alkoxy groups of 1 to 4 carbon atoms
- $R_6$=hydrogen, or allyl, alkyl or alkenyl groups of 1 to 4 carbon atoms
- $R_7$=hydrogen, or allyl, alkyl or alkenyl groups of 1 to 4 carbon atoms
  wherein at least one of $R_5$, $R_6$ and $R_7$ is an allyl group
- m=1 to 3
- n=1 to 3
- o=1 to 2.

41. A curable polymer composition comprising:
- a polymeric component containing ethylene;
- an initiator component; and
- an allyl compound component comprising at least one of 2-allylphenol; 2-allyl phenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; and tetramethyl diallylbisphenol A.

42. A curable polymer composition comprising:
- a polymeric component containing ethylene;
- an initiator component; and
- an allyl compound component as a scorch retarder, wherein said allyl compound component is present in an amount less than 0.6 wt % of the total weight of said polymer composition.

43. The curable polymer composition according to claim 42, wherein said allyl compound component is present in an amount less than 0.5 wt % of the total weight of said polymer composition.

44. The curable polymer composition according to claim 43, wherein said allyl compound component is present in an amount less than 0.4 wt % of the total weight of said polymer composition.

45. The curable polymer composition according to claim 42, wherein said allyl compound component does not comprise allyl esters and allyl derivatives of heterocyclic aromatics.

46. The curable polymer composition according to claim 42, wherein said allyl compound component comprises at least one of mono phenyl derivatives and bis-phenyl derivatives.

47. The curable polymer composition according to claim 46, wherein said allyl compound component comprises at least one mono phenyl derivative comprising the following structure:

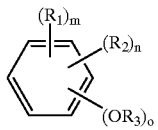

wherein:
- $R_1$=allyl, alkyl, alkenyl or alkoxy groups of 1 to 4 carbon atoms
- $R_2$=hydrogen, or allyl, alkyl or alkenyl groups of 1 to 4 carbon atoms
- $R_3$=hydrogen, or allyl, alkyl or alkenyl groups of 1 to 4 carbon atoms
  wherein at least one of $R_1$, $R_2$ and $R_3$ is an allyl group
- m=1 to 3
- n=1 to 3
- o=1 to 2.

48. A curable polymer composition comprising:
- a polymeric component;
- an initiator component; and
- an allyl compound component as a scorch retarder, wherein said allyl compound component is present in an amount less than 0.6 wt % of the total weight of said polymer composition; and
- said allyl compound component comprises at least one bis-phenyl derivative comprising the following structure:

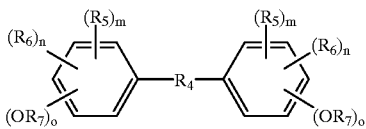

wherein:

$R_4$=2-propyl, methyl, S, O or a covalent bond $R_5$=allyl, alkyl, alkenyl or alkoxy groups of 1 to 4 carbon atoms $R_6$=hydrogen, or allyl, alkyl or alkenyl groups of 1 to 4 carbon atoms $R_7$=hydrogen, or allyl, alkyl or alkenyl groups of 1 to 4 carbon atoms wherein at least one of $R_5$, $R_6$ and $R_7$ is an allyl group m=1 to 3 n=1 to 3 o=1 to 2.

49. A curable polymer composition comprising:

a polymeric component containing ethylene;

an initiator component; and an allyl compound component as a scorch retarder, wherein said allyl compound component comprises at least one mono phenyl derivative comprising the following structure:

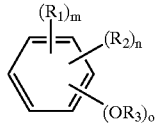

wherein:

$R_1$=allyl, alkyl, alkenyl or alkoxy groups of 1 to 4 carbon atoms $R_2$=hydrogen, or allyl, alkyl or alkenyl groups of 1 to 4 carbon atoms $R_3$=hydrogen, or allyl, alkyl or alkenyl groups of 1 to 4 carbon atoms wherein at least one of $R_1$, $R_2$ and $R_3$ is an allyl group m=1 to 3 n=1 to 3 o=1 to 2.

50. A curable polymer composition comprising:

a polymeric component containing ethylene;

an initiator component; and an allyl compound component as a scorch retarder, wherein said allyl compound component comprises at least one bis-phenyl derivative comprising the following structure:

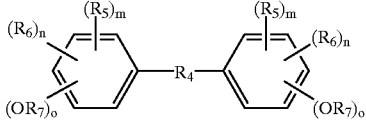

wherein:

$R_4$=2-propyl, methyl, S, O or a covalent bond $R_5$=allyl, alkyl, alkenyl or alkoxy groups of 1 to 4 carbon atoms $R_6$=hydrogen, or allyl, alkyl or alkenyl groups of 1 to 4 carbon atoms $R_7$=hydrogen, or allyl, alkyl or alkenyl groups of 1 to 4 carbon atoms wherein at least one of $R_5$, $R_6$ and $R_7$ is an allyl group m=1 to 3 n=1 to 3 o=1 to 2.

51. A method of forming a curable polymer composition comprising:

combining a polymeric component containing ethylene, an initiator component, and an allyl compound component; and the initiator component and the allyl compound component being combined in amounts effective so that at a measured cured state, as measured by MDR delta torque, there is provided an increase in Ts2 time of at least 10% as compared to said measured cured state of a curable polymer composition containing said polymeric component and said initiator component in the absence of said allyl compound component.

52. A method of forming a shaped article, comprising:

combining a polymeric component containing ethylene, an initiator component, and an allyl compound component to form a curable polymer composition, the initiator component and the allyl compound component being combined in amounts effective so that at a measured cured state, as measured by MDR delta torque, there is provided an increase in Ts2 time of at least 10% as compared to said measured cured state of a curable polymer composition containing said polymeric component and said initiator component in the absence of said allyl compound component; and shaping the curable polymer composition.

53. The method according to claim 52, further comprising curing said polymer composition.

54. The method according to claim 52, wherein said shaping comprises extrusion, pultrusion, compression molding, injection molding or rotomolding.

55. A cured polymer composition formed by curing the curable polymer composition of claim 1.

56. A cured polymer composition formed by curing the curable polymer composition of claim 3.

57. A method of increasing scorch time of a curable polymer composition comprising:

combining a polymeric component containing ethylene, an initiator component, and an allyl compound component; and balancing the initiator component and the allyl compound component relative to each other so that at a measured cured state, as measured by MDR delta torque, there is provided an increase in Ts2 time of at least 10% as compared to said measured cured state of a cuable polymer composition containing polymeric component and initiator component in the absence of said allyl compound component.

58. A cured polymer composition formed by curing the curable polymer composition of claim 5.

59. The curable polymer composition according to claim 41, wherein said polymeric component comprises copolymer containing ethylene.

60. The curable polymer composition according to claim 41, wherein said polymeric component comprises ethylene as a principal monomer.

61. The curable polymer composition according to claim 42, wherein said polymeric component comprises copolymer containing ethylene.

62. The curable polymer composition according to claim 42, wherein said polymeric component comprises ethylene as a principal monomer.

63. The curable polymer composition according to claim 49, wherein said polymeric component comprises copolymer containing ethylene.

64. The curable polymer composition according to claim 49, wherein said polymeric component comprises ethylene as a principal monomer.

65. The curable polymer composition according to claim 50, wherein said polymeric component comprises copolymer containing ethylene.

66. The curable polymer composition according to claim 50, wherein said polymeric component comprises ethylene as a principal monomer.

67. The curable polymer composition according to claim 51, wherein said polymeric component comprises copolymer containing ethylene.

68. The curable polymer composition according to claim 51, wherein said polymeric component comprises ethylene as a principal monomer.

69. The curable polymer composition according to claim 52, wherein said polymeric component comprises copolymer containing ethylene.

70. The curable polymer composition according to claim 52, wherein said polymeric component comprises ethylene as a principal monomer.

71. The curable polymer composition according to claim 57, wherein said polymeric component comprises copolymer containing ethylene.

72. The curable polymer composition according to claim 57, wherein said polymeric component comprises ethylene as a principal monomer.

* * * * *